3,350,442
SPIRO ACIDS
Leonard M. Rice, Minneapolis, Minn., and Charles H. Grogan, Falls Church, Va., assignors to Tri-Kem Corporation, Washington, D.C., a corporation of the District of Columbia
No Drawing. Filed May 6, 1964, Ser. No. 365,484
9 Claims. (Cl. 260—514)

ABSTRACT OF THE DISCLOSURE

Azaspirane structures in which the nitrogen atom in the spirane ring contains at least 1 carboxyl group and which are useful as intermediates for the preparation of plasticizers, antioxidants and pharmaceuticals. Representative examples of the class of compounds covered are 3,3-dicarboxy - spiro[5.5]undecane and 3 - carboxyspiro [5.5]undecane.

---

The present invention relates to novel synthetic compounds which are valuable as synthetic intermediates, and more particularly to novel spiro acids and their ring substituted derivatives.

The instant invention has a number of significant objects. A primary object of this invention is to provide novel synthetic compounds which are valuable for the preparation of plasticizers, antioxidants and pharmaceuticals.

Another object of the present invention is to provide spiranes bearing acidic functional groups and their ring substituted derivatives which can be used to make compounds which have important pharmacological and other activity.

Another important object of the present invention is to provide compounds of the formula:

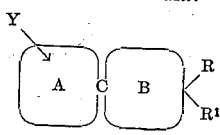

wherein ring A is selected from the group consisting of saturated carbocyclic rings containing from 5 to 15 carbon atoms, perhydroindenyl, decohydronaphthyl, and tetrahydronaphthyl; ring B is a saturated carbocyclic ring of 5–6 carbon atoms; Y is 1–3 members independently selected from the group consisting of hydrogen, alkyl of 1–12 carbon atoms, alkenyl of 2–12 carbon atoms, alkoxy of 1–12 carbon atoms, cycloalkyl of 3–15 carbon atoms, phenyl, naphthyl, phenylalkyl of 7–14 carbon atoms and halophenyl; R and $R^1$ are selected from the group consisting of hydrogen, nitrilo, phenyl and carboxyl, at least one of R and $R^1$ being carboxyl; and R and $R^1$ being at least one ring atom removed from the spiro carbon atom C.

These and further important objects and advantages of the present invention will become more apparent through reference to the ensuing description and appended claims.

The general structural formula of the novel compounds of the present invention is illustrated by Formula I.

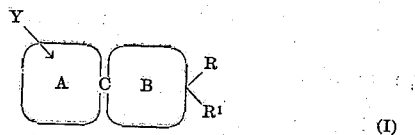

In this formula, the spirane structure comprises rings A and B and the spiro carbon atom interconnecting rings A and B. Ring A is a mono or bicyclic ring of at least 5 atoms. While there is no particular upper limit on the number of atoms in ring A, a ring of 5 to 15 ring atoms is preferred, such atoms being preferably (but not necessarily) carbon atoms. Ring B is a corbocyclic ring of 5 or 6 atoms. At least one of the substituents R and $R^1$ on ring B is carboxyl. In the case of monocarboxyl substitution on ring B the other of R or $R^1$ is hydrogen, nitrilo or phenyl. Alternatively both R and $R^1$ may be carboxyl. R and $R^1$ are located on a ring atom of ring B at least one ring atom removed from the spiro carbon atom C. The substituent Y on ring A is selected from the group consisting of hydrogen, alkyl, alkenyl, alkoxy, cycloalkyl, aryl and aralkyl groups, and a plurality of or combinations of such groups. While there is no upper limit to the size of the groups forming Y, alkyl, alkenyl and alkoxy groups of 1–6 carbon atoms are preferred.

The compounds of the present invention are valuable synthetic intermediates. For example, the acids may be converted into their salts and amides of the longer chain fatty amines (such as oleyl and lauryl amines) which have antioxidant properties and when added to hydrocarbon oils in contact with metals prevent or inhibit the corrosion of the metal. Conversion of the acids into their salts may be readily effected by reacting equimolar quantities of the acid and the amine in an organic medium in which they are both soluble (such as ethanol or methanol) and allowing the salt to crystallize spontaneously or precipitating the salt by adding another miscible solvent (such as ether or water) in which the acid and amine are soluble. Similarly, the acids may be converted into their corresponding amides by either reacting the appropriate primary amine with the ester of the acid or by heating the primary amine and the acid to a temperature sufficient to eliminate water. The alkyl esters (particularly the higher alkyl esters containing from 4 to 18 atoms in the esterifying group) are efficient plasticizers (i.e., for polyacrylates and other polyester plastics) because of their high boiling points and thermal stability.

The spiro acids of the present invention may also be used as synthetic intermediates in the preparation of compounds having valuable pharmacological properties. For example, the acid 3-carboxyspiro[5.5]undecane (see Example I) may be converted by means of the known Schmidt or Hofmann reactions to 3-aminospiro[5.5]undecanes which have valuable pharmacological and medicinal properties, i.e. analgesic and respiratory stimulatory properties. These pharmacologically valuable aminospiranes are the subject of copending application Ser. No. 219,752, filed Aug. 27, 1962 and now Patent 3,214,470.

In addition, the spiro acids of the present invention may be converted by conventional methods into esters and amides by reaction with alcohols and amines. As previously disclosed, when these amines are long chain amines antioxidants are obtained; when long chain alcohols are used, useful plasticizers are obtained. When the amines are lower alkyl, alkenyl or dialkyl amines, i.e., containing from 1 to 4 carbon atoms (i.e. methyl, ethyl, dimethyl, diethyl, allyl), or ammonia, the amides thus produced may be reduced to the corresponding amines which are pharmacologically active central nervous system stimulants.

Reaction of the spiro acids of the present invention with dialkylaminoalkanols, dialkylaminoalkylamines, heterocyclicalkanols and heterocyclicalkylamines produces amides and esters which have antispasmodic properties in mammals.

When the spiro carboxylic acids of the present invention are reacted with 6-aminopenicillanic acid, according to known methods, there results a new and novel class of antibiotically active synthetic penicillins.

Thus, the present invention provides new and useful synthetic intermediates valuable in the preparation of antioxidants, antispasmodics, pharmacologically valuable aminospiranes of copending application Ser. No. 219,752, plasticizers and a new class of synthetic penicillins.

The compounds of the present invention may be conveniently prepared from the appropriate alicyclic gem-bis-haloalkyl compound by condensing such compound under base-catalyzed condensation conditions with an appropriate reactant depending on the desired value of R and $R^1$. For synthesis of spiro dicarboxylic acids (wherein both R and $R^1$ are carboxyl) and spiro monocarboxylic acids (wherein R and $R^1$ are respectively carboxyl and hydrogen), the following reaction sequence may be employed:

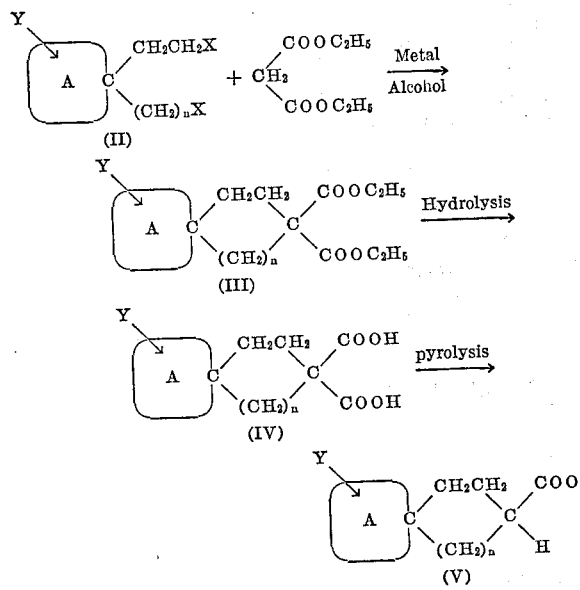

[Note: In the foregoing reaction sequence, Y and ring A have the values previously defined, n is 1–2 and X is a halogen atom.] In the above sequence, the dihaloalkyl compound (II) is condensed by means of a base condensing agent (such as sodium potassium or their amides) with a malonic ester to yield the diester of the spiro diacid (III) in one step. This spiro diacid ester is then hydrolyzed to give the spiro diacid (IV), which may be converted into the spiro monocarboxylic acid (V) by pyrolysis. In general, the conversion of (IV) into (V) may be accomplished simply by heating (IV) above its melting point when monodecarboxylation occurs.

While any malonic ester may be utilized for the purposes of carrying out this process, the diethyl malonic ester is preferred. The preferred gem-bis-haloalkyl compound is the bromo compound, with the chloro and iodo compounds being next in order of preference.

Another method for synthesizing the compounds of the present invention involves the base-catalyzed condensation of the appropriate gem-bis-haloalkyl compound with a cyanoacetic ester. Depending upon the nature of the hydrolysis step employed, a spiro monocarboxylic acid-nitrilo compound or a spiro dicarboxylic acid compound may be obtained, as follows:

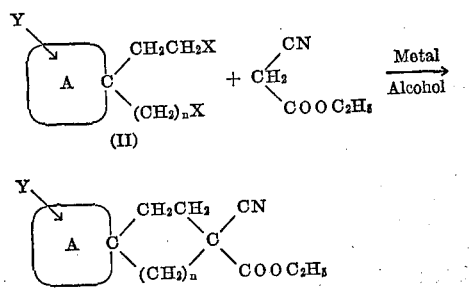

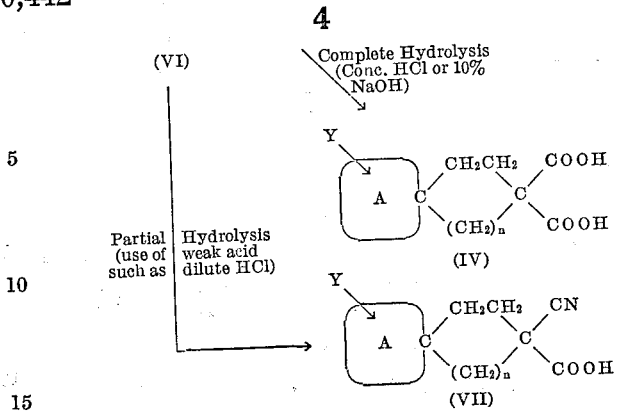

In the above sequence, the dihaloalkyl compound (II) is condensed with the cyanoacetic ester as in the case of the previously described method to yield the nitrilo compound (VI). When compound (VI) is completely hydrolyzed, the spiro dicarboxylic acid (IV) results. As will be apparent, compound (IV) may be converted into the spiro monocarboxylic acid (V) as before by decarboxylation.

Still another technique, in which one of R and $R^1$ is phenyl, involves the base-catalyzed condensation of the appropriate gem-bis-haloalkyl compound with phenyl-acetonitrile, as follows:

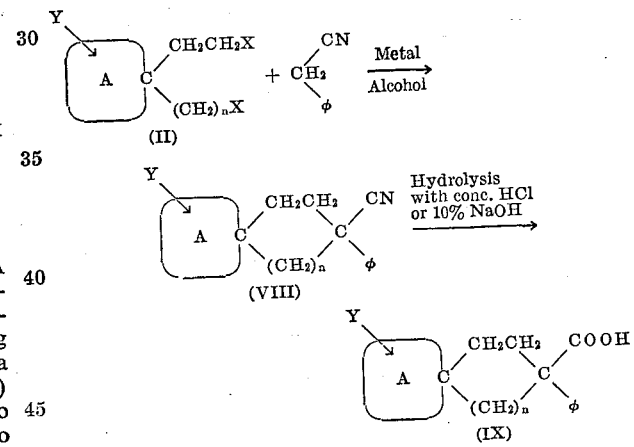

In the above sequence, the dihaloalkyl compound (II) is condensed with the phenylacetonitrile as in the case of the previously described methods to yield the phenyl-nitrilo compound (VIII). When compound (VIII) is hydrolyzed, the phenyl-substituted monocarboxylic spiro acid results.

Quite obviously, substituted phenyl spior acids may be synthesized by using a substituted phenylacetonitrile. Merely by way of example, the phenyl group may be substituted with alkyl, alkoxy, alkenyl (preferably but not restricted to the $C_1$–$C_6$ species), halogen and nitro groups. When used in this specification and claims, phenyl shall be construed, therefore, to include substituted phenyl.

The following illustrative examples will illustrate the present invention:

EXAMPLE I (A) *3,3-dicarboethoxyspiro[5.5]undecane*

A solution of sodium ethoxide is prepared by dissolving 13.1 gm. of sodium in 240 ml. of absolute ethanol in a 2 liter flask equipped with stirrer, dropping funnel and protected from atmospheric moisture. When the sodium ethoxide was prepared, 45.7 gm. of diethyl malonate was added, the mixture stirred for 15 minutes and 60 gm. of 1,1-bis-(β-bromoethyl)cyclohexane added as rapidly as possible (so as to keep the reaction from becoming too violent). The mixture was refluxed for 24 hours, cooled, acidified with 10% HCl and diluted with sufficient water to just dissolve the inorganic salt formed. The solution was extracted twice with 250 ml. of ether, the ether extract dried over anhydrous magnesium sulfate and the ether stripped off. The residue was distilled under reduced pressure and all material boiling over 150° C. at .17 mm. retained. Redistillation of the high boiling fraction yielded the desired ester, B.P. 123–125° C./0.2 mm., 39.5 gm., 68% yield.

(B) *3,3-dicarboxyspiro[5.5]undecane*

The ester from (A) (39 gm.) was refluxed for 2 hours with 37.5 gm. of potassium hydroxide in 400 ml. of absolute alcohol. After cooling, the separated potassium salt of the title acid was filtered off, dissolved in 400 ml. of warm water, treated with decolorizing charcoal, filtered, and reprecipitated with 10% sulfuric acid. There was obtained 25.5 gm. of the title acid, M.P. 196–198° C. with decomposition after recrystallization from aqueous-ethanol.

(C) *3-carboxyspiro[5.5]unedecane*

The dicarboxylic acid from (B) (24.5 gm.) was heated in an oil bath at 200° C. until evolution of carbon dioxide ceased and a clear melt resulted. Distillation of the residue yielded the title compound, B.P. 126–132° C./0.05 mm., 18.6 gm., 93% yield, M.P. 74.5–77° C. On recrystallization from benzene-ethyl acetate, it melted at 77–78° C.

EXAMPLE II (A) *3,3-dicarboethoxyspiro[4.5]decane*

This diester was prepared as detailed in Example I(A) from 1,1-bis(β-bromoethyl)cyclopentane. From 198 gm. of the dihalo compound was obtained 155 gm. of the title compound, B.P. 120–122° C./0.6 mm.

(B) *3,3-dicarboxyspiro[4.5]decane*

Hydrolysis and work up of the ester from II(A), as described in detail in Example I(B), gave the title acid, 101 gm., from 155 gm. of the diester, M.P. 200–201° C.

(C) *3-carboxyspiro[4.5]decane*

The title compound was obtained on pyrolysis of 97 gm. of the diacid from II(B), yielding 72 gm. of the title compound, B.P. 128–133° C./0.6 mm. It melted at 53–54° C. on recrystallization from aqueous ethanol.

EXAMPLE III (A) *9-methyl-3,3-dicarboethoxyspiro[5.5]undecane*

The title ester was prepared from 1,1-bis-(β-bromoethyl-4-methylcyclohexane as detailed in Example I(A). 40 gm. of the dibromoethyl compound yielded 28.7 gm. of the title diester, B.P. 133–136° C./0.6 mm.

(B) *9-methyl-3,3-dicarboxyspiro[5.5]undecane*

Hydrolysis of 26 gm. of the diester from Example III(A) proceeding as detailed in Example I(B) gave 19 gm. of the title diacid, M.P. 200–201° C. with decomposition after recrystallization from aqueous ethanol.

(C) *9-methyl-3-carboxyspiro[5.5]undecane*

Decarboxylation and distillation of 17 gm. of the diacid from Example III(B) yielded 12 gm. of the title acid, B.P. 135–139° C./0.6 mm., M.P. 89–90° C. after recrystalliaztion from petroleum ether.

EXAMPLE IV (A) *2,2-dicarboethoxyspiro[4.5]decane*

This was prepared as outlined in Example I(A) from 1-bromoethyl-1-bromomethyl cyclohexane. From 22 gm. of this dibromide there was obtained 11.8 gm. of product which boiled at 99–101° C./0.1 mm.

(B) *2,2-dicarboxyspiro[4.5]decane*

Hydrolysis of 10 gm. of the diester from Example IV(A) gave 7.5 gm. of the title diacid, which melted at 173–174° C. with decomposition.

(C) *2-carboxyspiro[4.5]decane*

Decarboxylation of the diacid from Example IV(B) is accomplished by heating at 180° C. Distillation of the residue from the decarboxylation reaction yielded the title acid (5.5 gm. from 7 gm. of the diacid), B.P. 108–112° C./0.1 mm.

The synthesising procedures outlined in the foregoing examples have embraced a variety of alicyclic gem-bishaloalkyl derivatives yielding products coming within the scope and breadth of the present invention. These examples are intended to be illustrative only and not restrictive of the scope of the present invention. For example, numerous other examples of gem-alicyclic alkyl halides which may be employed to obtain the products of the present invention may be enumerated, such as (but not limited to):

3-methyl-1-bromomethyl-1-(β-bromoethyl)cyclopentane;
3-methyl-1,1-bis(β-bromoethyl)cyclopentane;
1,1-bis-(β-bromoethyl)-cycloheptane;
1-bromomethyl-1-(β-bromoethyl)cycloheptane;
1-bromomethyl-1-(β-bromoethyl)-cyclooctane;
4-tert. butyl-1,1-bis(β-bromoethyl)cyclohexane;
4-tert. butyl-1-bromomethyl-1-(β-bromoethyl)cyclohexane;
4-methoxy-1,1-bis(β-bromoethyl)cyclohexane;
4-phenyl-1,1-bis-(β-bromoethyl)cyclohexane;
4-cyclohexyl-1,1-bis-(β-bromoethyl)cyclohexane;
3-methyl-1,1-bis(β-bromoethyl)cyclohexane;
3,3-dimethyl-1,1-bis(β-bromoethyl)cyclohexane;
hexahydrohydrindene-2,2-bis-(β-bromoethyl);
hexahydrohydrindene-2-bromoethyl-2-(β-bromoethyl);
decalin-2,2-bis(β-bromoethyl);
tetralin-1-bromoethyl-1-(β-bromoethyl);
1-bromomethyl-1-(β-bromoethyl)cyclododecane;
1-bromomethyl-1-(β-bromoethyl)cyclopentadecane;
4-hexyl-1,1-bis-(β-bromoethyl)cyclohexane;
4-dodecyl-1,1-bis-(β-bromoethyl)cyclohexane;
4-allyl-1,1-bis-(β-bromoethyl)cyclohexane;
4-(4-hexenyl)1,1-bis-(β-bromoethyl)-cyclohexane;
4-(11-dodecenyl)-1,1-bis-(β-bromoethyl)-cyclohexane;
4-propoxy-1,1-bis-(β-bromoethyl)cyclohexane;
4-dodecoxy-1,1-bis-(β-bromoethyl)cyclohexane;
4-cyclooctyl-1,1-bis-(β-bromoethyl)cyclohexane;
4-cyclododecyl-1,1-bis-(β-bromoethyl)cyclohexane;
4-cyclopentadecyl-1,1-bis-(β-bromoethyl)cyclohexane;
4-(2-naphthyl)-1,1-bis-(β-bromoethyl)-cyclohexane;
4-benzyl-1,1-bis-(β-bromoethyl)-cyclohexane;
4-phenylpropyl-1,1-bis-(β-bromoethyl)cyclohexane;
4-phenyloctyl-1,1-bis-(β-bromoethyl)cyclohexane;
4-phenyl-4-isopropyl-1,1-bis-(β-bromoethyl)cyclohexane;
4-cyclohexyl-4-methyl-1,1-bis-(β-bromoethyl)cyclohexane;
4-phenylethyl-4-methyl-1,1-bis-(β-bromoethyl)cyclohexane;
4,4-diphenyl-1,1-bis-(β-bromoethyl)cyclohexane;
4,4-dicyclohexyl-1,1-bis-(β-bromoethyl)cyclohexane;
4-chlorophenyl-1,1-bis-(β-bromoethyl)cyclohexane;
etc.

The following illustrative examples of the use of the novel spiro acids of the present invention are included in this specification by way of specific illustration of the wide utility of the materials forming the subject matter of this invention.

EXAMPLE V

*Conversion of 3-carboxyspiro[5.5]undecane to 3-aminospiro[5.5]undecane*

3-carboxyspiro[5.5]undecane (5.8 gm.) was dissolved in a mixture of 41 ml. of conc. sulfuric acid and 50 ml. of chloroform at 50° C. To this was added in small portions with stirring 2.3 gm. of sodium azide and the mixture maintained at 50° C. for 30 minutes, cooled, diluted with 200 gm. of ice and made alkaline with 20% sodium hydroxide. This solution was extracted three times with 100 ml. portions of ether and the ether extracts combined and extracted three times with 50 ml. portions of 10% hydrochloric acid. The combined acid extracts were made alkaline with sodium hydroxide and reextracted three times with 100 ml. portions of ether. The ether extracts were combined, washed with saturated salt solution, dried over anhydrous sodium sulfate, filtered and the ether stripped off. The residue, 3-aminospiro[5.5]undecane, was distilled and gave 2.8 gm. of product (57% yield), B.P. 90-92° C./4.0 mm. Conversion of this base to the hydrochloride gave the salt which melted at 298-300° C. with decomposition, identical with the product described in Example 1 of copending application Ser. No. 219,752, now Patent 3,214,170.

EXAMPLE VI

*6-(4,4-spiropentamethylenecyclohexane-1-carboxamido)penicillanic acid*

To a solution of 9.8 gm., 0.05 moles, of spiro-4,4-pentamethylenecyclohexane-3-carboxylic acid (3-carboxyspiro[5.5]undecane) in 100 ml. of dry acetone was added 1 equivalent of triethylamine, 5.05 gm. The solution was cooled to 0-5° C. and 5.4 gm. of ethyl chloroformate added slowly. After stirring 20 minutes at 5° C., a solution of 6-aminopenicillanic acid (10.8 gm., 0.05 mole) in acetone was added and the solution stirred for 30 minutes while the temperature rose to room temperature. The reaction mixture was filtered and the filtrate treated with 0.055 mole of potassium ethyl hexanoate in methyl ethyl ketone. The title compound precipitated and was filtered off, washed with acetone and ether and dried. There was obtained 14.5 gm. of the title compound.

As will be apparent from the foregoing description, a large variety of novel compounds may be made by the procedures described within the framework of the present invention. Numerous examples of such compounds (or materials which may be used to form them) have already been given. Still additional examples include 3-phenyl-3-carboxyspiro[5.5]undecane; 3-(4-chlorophenyl)-3-carboxyspiro[5.5]undecane; 3-(4-methoxyphenyl)-3,3-dicarboxyspiro[5.5]undecane; 3-(4-cyclohexylphenyl)3-carboxyspiro[5.5]undecane; 3-(4-nitrophenyl)-3-carboxyspiro[5.5]undecane; 3-(4-methylphenyl)-3-carboxyspiro[5.5]undecane; etc.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A compound of the formula:

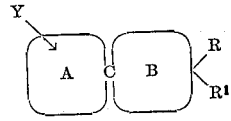

wherein ring A is selected from the group consisting of saturated carbocyclic rings containing from 5 to 15 carbon atoms, perhydroindenyl, decahydronaphthyl and tetrahydronaphthyl; ring B is a saturated carbocyclic ring of 5-6 carbon atoms; Y is 1-3 members independently selected from the group consisting of hydrogen, alkyl of 1-12 carbon atoms, alkenyl of 2-12 carbon atoms, alkoxy of 1-12 carbon atoms, cycloalkyl of 3-15 carbon atoms, phenyl, naphthyl, phenylakyl of 7-14 carbon atoms and halophenyl; R and $R^1$ are selected from the group consisting of hydrogen, nitrilo, phenyl and carboxyl, at least one of R and $R^1$ being carboxyl; and R and $R^1$ being at least one ring atom removed from the spiro carbon atom C.

2. 3,3-dicarboxyspiro[5.5]undecane.
3. 3-carboxyspiro[5.5]undecane.
4. 3,3-dicarboxyspiro[4.5]decane.
5. 3-carboxyspiro[4.5]decane.
6. 9-methyl-3,3-dicarboxyspiro[5.5]undecane
7. 9-methyl-3-carboxyspiro[5.5]undecane.
8. 2,2-dicarboxyspiro[4.5]decane.
9. 2-carboxyspiro[4.5]decane.

References Cited

Burnell et al., "J. Chem. Soc. (London)" (1954) part 3, pp. 3486-3488.

Othman et al., "Tetrahedron hetters," (1963) pp. 1339-1344.

RICHARD K. JACKSON, *Primary Examiner.*

UNITED STATES PATENT OFFICE

CERTIFICATE OF CORRECTION

Patent No. 3,350,442 October 31, 1967

Leonard M. Rice et al.

It is hereby certified that error appears in the above numbered patent requiring correction and that the said Letters Patent should read as corrected below.

Column 1, line 45, for "decohydronaphthyl" read -- decahydronaphthyl --; column 2, line 4, for "corbocyclic" read -- carbocyclic --; column 4, line 53, for "spior" read -- spiro --; column 7, line 16, for "3,214,170" read -- 3,214,470 --; line 38, for "proceduries" read -- procedures --.

Signed and sealed this 3rd day of December 1968.

(SEAL)
Attest:

Edward M. Fletcher, Jr.
Attesting Officer

EDWARD J. BRENNER
Commissioner of Patents